United States Patent
Takeichi

(10) Patent No.: US 7,852,507 B2
(45) Date of Patent: Dec. 14, 2010

(54) METHOD, APPARATUS, AND PROGRAM FOR PROCESSING IMAGE DESCRIPTION DATA

(75) Inventor: Shinya Takeichi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1047 days.

(21) Appl. No.: 11/444,634

(22) Filed: Jun. 1, 2006

(65) Prior Publication Data
US 2006/0274349 A1 Dec. 7, 2006

(30) Foreign Application Priority Data
Jun. 3, 2005 (JP) .............................. 2005-163964

(51) Int. Cl.
*G06K 15/00* (2006.01)
*G09G 5/00* (2006.01)

(52) U.S. Cl. ..................................... 358/1.18; 345/648

(58) Field of Classification Search ................. 358/1.9, 358/1.13, 2.1, 1.18; 715/234, 239; 345/581, 345/619, 644, 648; 707/101; 341/87
See application file for complete search history.

(56) References Cited

U.S. PATENT DOCUMENTS

| | | | | |
|---|---|---|---|---|
| 4,283,765 A | * | 8/1981 | Rieger | 345/427 |
| 4,719,588 A | * | 1/1988 | Tatemichi et al. | 708/607 |
| 5,222,200 A | * | 6/1993 | Callister et al. | 358/1.13 |
| 5,881,168 A | | 3/1999 | Takaoka | |
| 5,937,153 A | * | 8/1999 | Gauthier | 358/1.17 |
| 5,960,113 A | * | 9/1999 | Even et al. | 382/229 |
| 6,100,998 A | * | 8/2000 | Nagao et al. | 358/1.9 |
| 6,337,744 B1 | * | 1/2002 | Kuroda | 358/1.13 |
| 6,992,782 B1 | * | 1/2006 | Yardumian et al. | 358/1.13 |
| 7,466,441 B2 | * | 12/2008 | Barry et al. | 358/1.15 |
| 2002/0097419 A1 | * | 7/2002 | Chang et al. | 358/1.13 |
| 2005/0052693 A1 | | 3/2005 | Kadota | |
| 2006/0139679 A1 | * | 6/2006 | Barry et al. | 358/1.13 |
| 2008/0018924 A1 | * | 1/2008 | White et al. | 358/1.13 |

FOREIGN PATENT DOCUMENTS

| | | |
|---|---|---|
| EP | 0564201 A2 | 10/1993 |
| EP | 0564201 A3 | 6/1994 |
| EP | 0564201 B1 | 5/2000 |
| JP | 63-071779 A | 4/1988 |
| JP | 06-243210 A | 9/1994 |
| JP | 6-333006 A | 12/1994 |
| JP | 11-024866 A | 1/1999 |
| JP | 2000-092315 A | 3/2000 |

(Continued)

*Primary Examiner*—Benny Q Tieu
*Assistant Examiner*—Eric A Rust
(74) *Attorney, Agent, or Firm*—Canon U.S.A., Inc. I.P. Division

(57) ABSTRACT

An image description data processing method is provided for execution in an apparatus including a holding unit configured to hold image description data described in an image description language including one of a page description language and a structured language. The method includes acquiring first image description data from the holding unit; extracting a description of a first rendering command from the acquired first image description data; calculating the description of the first rendering command to replace the description of the first rendering command with a description of a second rendering command; and storing second image description data containing the description of the second rendering command in the holding unit.

8 Claims, 14 Drawing Sheets

FOREIGN PATENT DOCUMENTS

| | | |
|---|---|---|
| JP | 2001-219602 A | 8/2001 |
| JP | 2002-108850 A | 4/2002 |
| JP | 2002-318680 A | 10/2002 |
| JP | 2004-240491 A | 8/2004 |
| JP | 2005-084898 A | 3/2005 |

\* cited by examiner

FIG.4

```
2: <g transform="translate(150 200)">
3:   <g transform="scale(2 3)">
4:     <rect transform="rotate(30)" x="-30" y="-20" width="60" height="40"
5:           fill="red"/>
6:   </g>
7: </g>
```

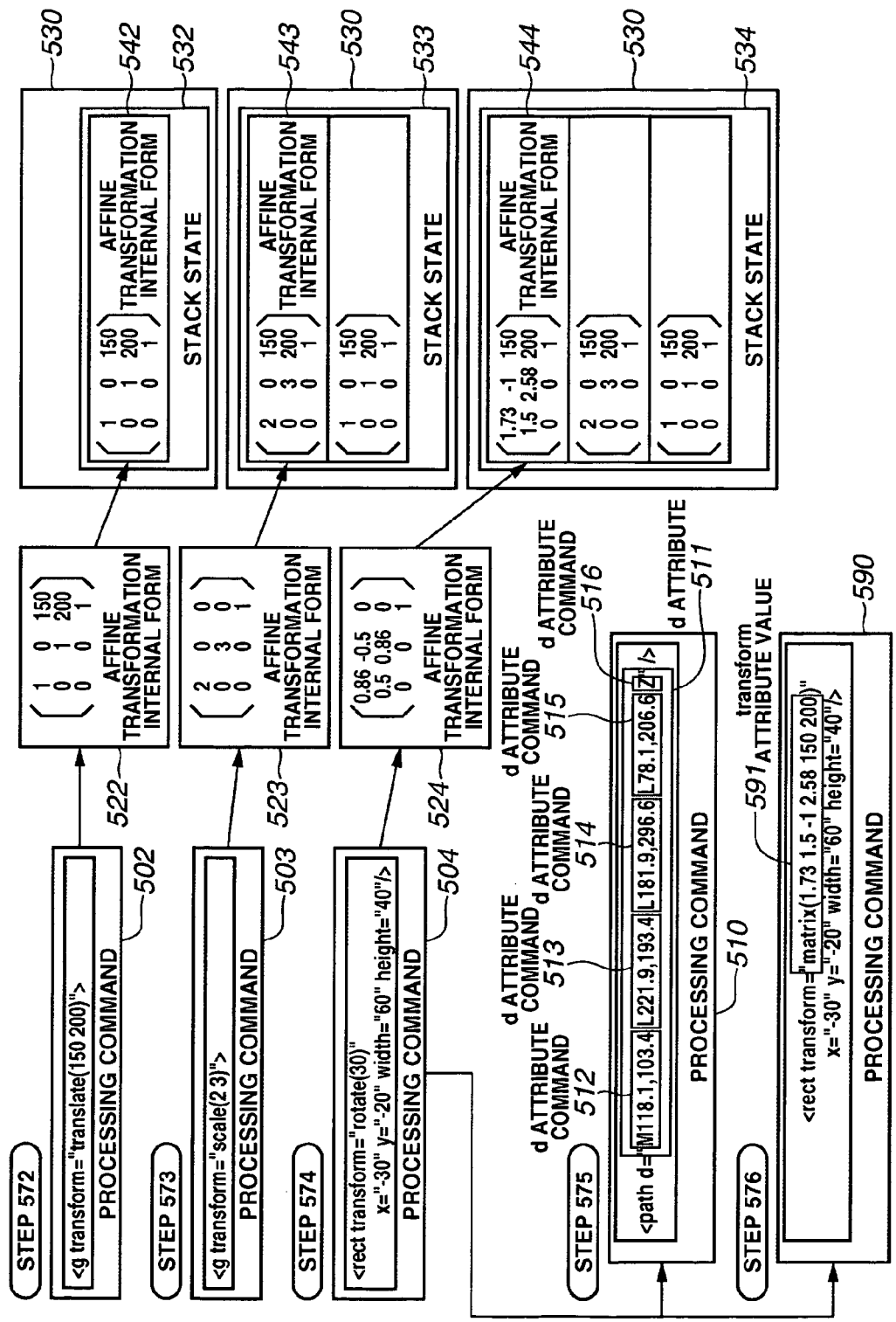

FIG.6A $$\begin{pmatrix} a & c & e \\ b & d & f \\ 0 & 0 & 1 \end{pmatrix}$$

FIG.6B matrix(a b c d e f)

FIG.9

```
2:    <text x="10" y="100" dx="10 10 10 10">
3:    ABCD
4:    </text>
```

```
 1:  % affine.ps
 2:
 3:  4 3 scale
 4:  50 80 translate
 5:  30 rotate
 6:
 7:  0 0 moveto
 8:  30 0 lineto
 9:  30 24 lineto
10:  0 24 lineto
11:  closepath
12:
13:  5 setlinewidth
14:  stroke
15:
16:  showpage
```

```
 1:  % anchor.ps
 2:
 3:  /Helvetica findfont 50 scalefont setfont
 4:
 5:  /anchor-center
 6:  { dup stringwidth pop
 7:     2 div neg
 8:     0 rmoveto
 9:     show
10:  } def
11:
12:  /anchor-right
13:  { dup stringwidth pop
14:     neg
15:     0 rmoveto
16:     show
17:  } def
18:
19:  300 300 moveto (right) anchor-right
20:  300 400 moveto (center) anchor-center
21:  300 500 moveto (left) show
22:
23:  showpage
```

```
           left center right
```

FIG.13A $$\begin{pmatrix} x' \\ y' \\ 1 \end{pmatrix} = \begin{pmatrix} a & c & e \\ b & d & f \\ 0 & 0 & 1 \end{pmatrix} \times \begin{pmatrix} x \\ y \\ 1 \end{pmatrix}$$

FIG.13B $$\begin{pmatrix} x' \\ y' \\ 1 \end{pmatrix} = \begin{pmatrix} a1 & c1 & e1 \\ b1 & d1 & f1 \\ 0 & 0 & 1 \end{pmatrix} \times \begin{pmatrix} a2 & c2 & e2 \\ b2 & d2 & f2 \\ 0 & 0 & 1 \end{pmatrix} \times \cdots \times \begin{pmatrix} an & cn & en \\ bn & dn & fn \\ 0 & 0 & 1 \end{pmatrix} \times \begin{pmatrix} x \\ y \\ 1 \end{pmatrix}$$

```
/widepitch
    {   /pitch exch def
        /str exch def
        gsave
            str
            { /charcode exch def
                ( ) dup 0 charcode put placechar
            } forall
            grestore
    } def /placechar
    { /char exch def
      gsave
      char show
      grestore
      pitch 0 rmoveto
    } def /Times-Roman findfont 50 scalefont setfont 100 150 moveto (NORMAL) show
100 100 moveto (WIDE) 100 widepitch showpage
```

NORMAL
W    I    D    E (PRIOR ART)
FIG.15A

```
/outsidecircletext
    { circtextdict begin
        /radius exch def
        /centerangle exch def
        /ptsize exch def
        /str exch def
        /xradius radius ptsize 4 div add def gsave
            centerangle str findhalfangle add rotate
            str
                { /charcode exch def
                    ( ) dup 0 charcode put outsideplacechar
                } forall
            grestore
        end
    } def
/insidecircletext
    { circtextdict begin
        /radius exch def /centerangle exch def
        /ptsize exch def /str exch def /xradius radius ptsize 3 div sub def
        gsave
            centerangle str findhalfangle sub rotate
            str
                { /charcode exch def
                    ( ) dup 0 charcode put insideplacechar
                } forall
            grestore
        end
    } def
/circtextdict 16 dict def
circtextdict begin
    /findhalfangle
        { stringwidth pop 2 div
            2 xradius mul pi mul div 360 mul
        } def
/outsideplacechar
    { /char exch def
        /halfangle char findhalfangle def
        gsave
            halfangle neg rotate
            radius 0 translate
            -90 rotate
            char stringwidth pop 2 div neg 0 moveto
            char show
        grestore
        halfangle 2 mul neg rotate
    } def
/insideplacechar
    { /char exch def
        /halfangle char findhalfangle def
        gsave
            halfangle rotate
            radius 0 translate
            90 rotate
            char stringwidth pop 2 div neg 0 moveto
            char show
        grestore
        halfangle 2 mul rotate
    } def
/pi 3.1415923 def
end /Times-Bold findfont 22 scalefont setfont 306 448 translate (Symphony No.9 (The Choral Symphony))
    22 90 140 outsidecircletext /Times-Roman findfont 15 scalefont setfont (Ludwig von Beethoven)
    15 90 118 outsidecircletext (The New York Philharmonic Orchestra)
    15 270 118 insidecircletext showpage
```

(PRIOR ART)
FIG.15B

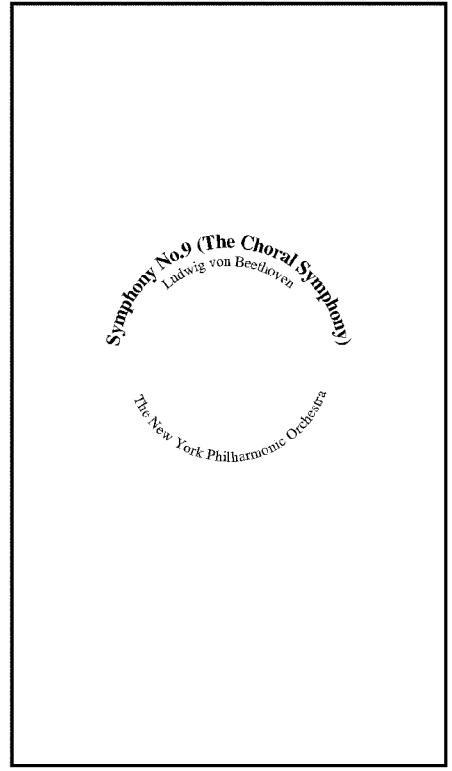

METHOD, APPARATUS, AND PROGRAM FOR PROCESSING IMAGE DESCRIPTION DATA

BACKGROUND OF THE INVENTION

1. Field of the Invention

The present invention relates to a method, an apparatus, and a program for processing image description data expressed in an image description language.

2. Description of the Related Art

A result of processing data by an information processing apparatus has conventionally been output at high quality to a laser printer or the like. Thus, a parser for a page description language which is one of an image description language type is mounted on a printer, and parsing of page description data is executed by the printer to perform rendering. A representative page description language is POSTSCRIPT™ provided by Adobe Systems Incorporated.

Some of the existing page description languages have affine transformation commands prepared for graphics and characters in addition to commands for designating coordinates and colors. Affine transformation processing is geometrical transformation processing of graphics which includes enlargement, reduction, rotation, translation processing, and the like for graphics and characters. In many cases, the processing is generally accompanied by a linear transformation and a translation. The affine transformation processing can be carried out in multiple manners. For example, processing for executing a translation after transformation of rotation for graphics or characters can be expressed by the existing page description language.

Conventionally, when a rendering processing command described in a page description data contains an affine transformation processing command, an iterative calculation is performed in, e.g., a printer, to perform rendering processing according to the description. FIGS. 11A and 11B show an example of rendering a rectangle by executing an affine transformation in multiple manners according to description specifications of POSTSCRIPT™. FIG. 11A shows page description data described in POSTSCRIPT™ language, while FIG. 11B shows a result of rendering processing.

Referring to FIG. 11A, an affine transformation processing command is executed at 3rd to 5th lines, and a graphic is rendered at 7th to 11th lines. The graphic designated to be rendered at the 7th to 11th lines is a rectangle parallel to X and Y axes and having one apex set as an origin. However, as shown in FIG. 11B, an actually rendered graphic becomes a parallelogram due to the affine transformation processing performed at the 3rd to 5th lines.

Furthermore, in the existing page description languages, a character string can be rendered with a layout designated. FIGS. 12A and 12B show a description example of head, center, and tail alignments relative to designated points. FIG. 12A shows page description data described in POSTSCRIPT™ language, and FIG. 12B shows a result of executing rendering processing.

Referring to FIG. 12A, definition is made for a center alignment at 5th to 10th lines, and a right alignment at 12th to 17th lines. At 19th to 21st lines, the same X coordinates are designated. Additionally, a layout is calculated for a designated point by description to refer to a center or right alignment, so that a rendering result such as that shown in FIG. 12B can be obtained. Examples of enlarging a pitch between characters as shown in FIGS. 14A and 14B and arranging characters on a curve (circular arc) as shown in FIGS. 15A and 15B are discussed in "POSTSCRIPT Tutorial & Cookbook" (written by Adobe Systems, and edited by ASCII Publishing Technical Division).

Data described as the page description data shown in FIGS. 12A, 14A, and 15A have conventionally been subjected to rendering processing by internally calculating a layout in an image forming apparatus such as a printer.

Recently, specifications of Scalable Vector Graphics (SVG) have been formulated by World Wide Web Consortium (W3C), and its application to a page description language is now under study. As in the case of POSTSCRIPT™, SVG can render given graphics or characters by designating coordinates and colors or affine transformation processing. According to the specifications, designation methods for character layouts are diverse, and can be flexibly designated.

Conventional page description languages, structured languages, such as SVG, etc., are referred to as image description languages. As described above, when an affine transformation command is described in a page description language, processing is iterated, and a tree structure may be described deeper than necessary even in a structured language. Such unnecessary processing increases latency, and thereby, reduces the overall performance of the information processing apparatus.

To overcome the aforementioned drawbacks, there has been an attempt to reduce unnecessary processing due to, for instance, when an affine transformation command is described in a page description language. For example, in Japanese Patent Application Laid-open Nos. 2002-108850 and 2004-240491, in a structured language, layers of a tree structure are reduced or a structure transformation is carried out. However, the process performed in Japanese Patent Application Laid-open Nos. 2002-108850 and 2004-240491 have disadvantages because they do not reduce processing load of a processor suffering from rendering complicated image. It would be desirable to provide efficient preprocessing for rendering an image described with structured language data.

SUMMARY OF THE INVENTION

According to an aspect of the present invention, an image description data processing method is provided for execution in an apparatus including a holding unit configured to hold image description data described in an image description language including one of a page description language and a structured language. The method includes acquiring first image description data from the holding unit; extracting a description of a first rendering command from the acquired first image description data; calculating the description of the first rendering command to replace the description of the first rendering command with a description of a second rendering command; and storing second image description data containing the description of the second rendering command in the holding unit.

According to another aspect of the present invention, the image description data processing method may further include sending the second image description data to an image forming apparatus. According to another aspect of the present invention, the image description data processing method may further include forming an image rendered based on the second image description data.

According to another aspect of the present invention, the image description data may be described according to specifications of a structured language including Extensible Markup Language (XML). According to another aspect of the present invention, the image description data may be described according to specifications of a page description language including POSTSCRIPT™.

According to yet another aspect of the present invention, the description of the rendering command describes a command of rendering at least one of a rectangle, an ellipse, a circle, an elliptic arc, a circular arc, a line, a polygon, a polyline, a curve, a text, or a combination thereof. Moreover, according to another aspect of the present invention, the description of the rendering command includes an affine transformation command. Additionally, according to another aspect of the present invention, the description of the rendering command may include a layout command.

Furthermore, according to yet another aspect of the present invention, the replacement calculation may include executing a calculation to change the number of descriptions of the first rendering command. while in another aspect of the present invention, the replacement calculation may include executing a matrix calculation for the first rendering command. Moreover, according to yet another aspect of the present invention, the replacement calculation may include executing a replacement calculation according to a performance of the image forming apparatus when there are a plurality of description methods to change the number of descriptions of the first rendering command.

According to another aspect of the present invention, an apparatus is provided for processing image description data described in an image description language including one of a page description language and a structured language. Here, the apparatus includes a holding unit configured to hold the image description data; an acquisition unit configured to acquire first image description data from the holding unit; an extraction unit configured to extract a description of a first rendering command from the first image description data; a replacement calculation unit configured to calculate the description of the first rendering command to replace the description of the first rendering command by a description of a second rendering command; and a storage unit configured to store second image description data containing the description of the second rendering command in the holding unit.

And, according to yet another aspect of the present invention, a program for execution in an apparatus including a holding unit configured to hold image description data described in an image description language including one of a page description language and a structured language is provided. The program includes an acquisition step of acquiring first image description data from the holding unit; an extraction step of extracting a description of a first rendering command from the first image description data; a replacement calculation step of calculating the description of the first rendering command to replace the description of the first rendering command by a description of a second rendering command; and a storage step of storing second image description data containing the description of the second rendering command in the holding unit.

Furthermore, according to yet another aspect of the present invention, a computer readable medium is provided which contains computer-executable instructions for execution in an apparatus including a holding unit configured to hold image description data described in an image description language including one of a page description language and a structured language. Here, the medium includes computer-executable instructions for acquiring first image description data from the holding unit; computer-executable instructions for extracting a description of a first rendering command from the first image description data; computer-executable instructions for calculating the description of the first rendering command to replace the description of the first rendering command by a description of a second rendering command; and computer-executable instructions for storing second image description data containing the description of the second rendering command in the holding unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 4 is a diagram showing a portion of page description data when SVG is used as a page description language according to the first embodiment of the present invention.

FIG. 5 is a schematic diagram showing exemplary page description data replacement processing in the page description data processor according to the first embodiment of the present invention.

FIGS. 6A and 6B are supplementary diagrams of the page description data replacement processing in the page description data processor according to the first embodiment of the present invention.

FIG. 9 is a diagram showing a portion of page description data when SVG is used as a page description language according to the second embodiment of the present invention.

FIGS. 12A and 12B are diagrams showing an example of page description data in which text rendering processing is laid out by relative head, center, and tail alignments with respect to a designated point, and its rendering result.

FIGS. 13A and 13B are diagrams each showing a calculation method when affine transformation processing is carried out in a general two-dimensional XY coordinate system.

FIGS. 14A and 14B are diagrams showing an example of page description data in which text rendering processing is laid out by enlarging a pitch between characters, and its rendering result.

FIGS. 15A and 15B are diagrams showing an example of page description data in which text rendering processing is laid out on a designated curve, and its rendering result.

DETAILED DESCRIPTION OF THE EMBODIMENTS

Figure 1:
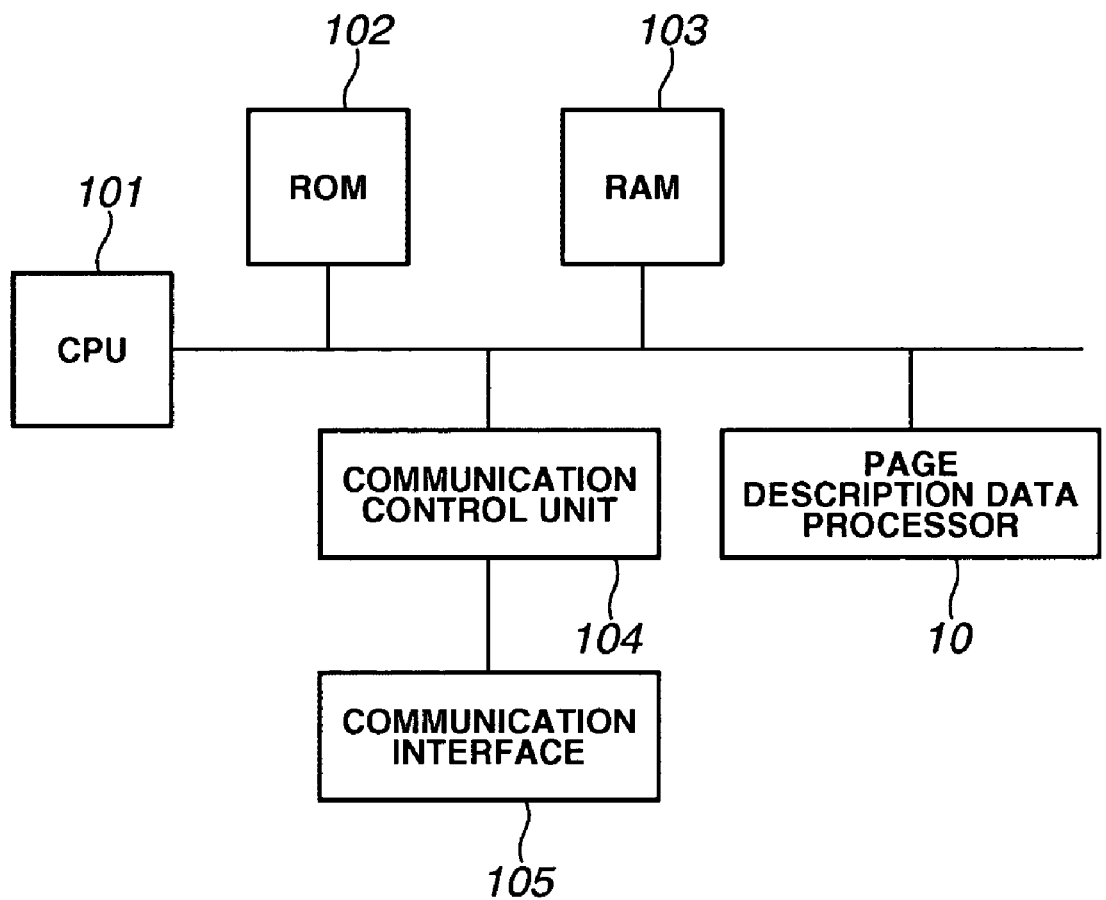
FIG. 1 is a block diagram showing an exemplary configuration of an information processing apparatus which includes a page description data processor according to embodiments of the present invention.

The following description of the exemplary embodiments are merely illustrative in nature and is in no way intended to limit the invention, its application, or uses. Note that similar reference numerals and letters refer to similar items in the following figures, and thus once an item is defined in one figure, it may not be discussed for following figures. Exemplary embodiments will be described in detail below in accordance with the accompanying drawings.

First Exemplary Embodiment

FIG. 1 is a block diagram showing an exemplary configuration of an information processing apparatus which includes a page description data processor according to an exemplary embodiment of the present invention. A CPU 101 is a system control unit which controls the apparatus. A ROM 102 stores a control program of the CPU 101 and various fixed data. A RAM 103 includes an SDRAM, a DRAM or the like to store program control variables, various frame buffers or the like. A communication control unit 104 carries out control of data communication executed through a communication interface 105. The communication interface 105 can be an IEEE 1394 interface, a wired LAN interface, a wireless LAN interface or the like, and the embodiment is not limitative in this regard. A page description data processor 10 performs processing for replacing page description data stored in the RAM 103 by another page description data and storing another page description data in the RAM 103.

Figure 2:
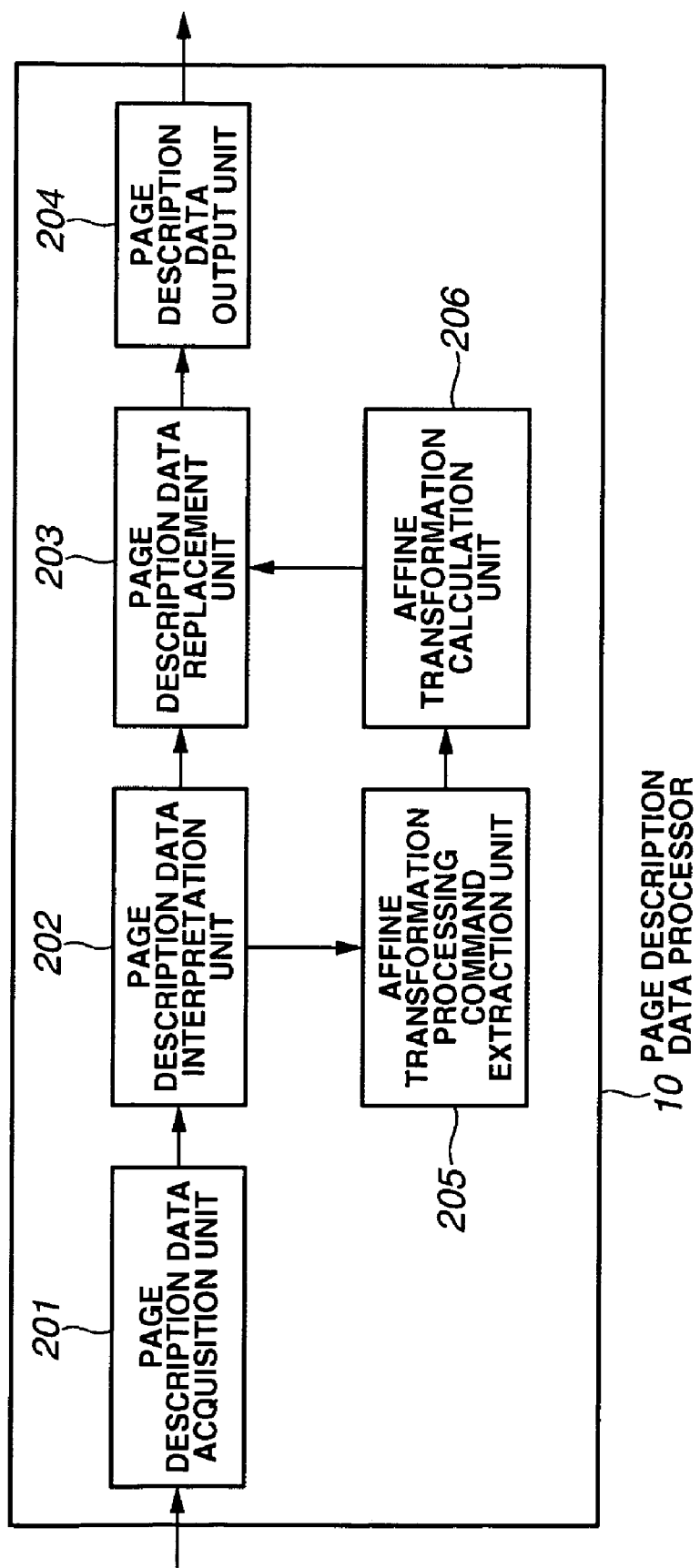
FIG. 2 is a block diagram showing an exemplary configuration of a page description data processor according to a first embodiment of the present invention.

FIG. 2 is a block diagram showing an exemplary configuration of the page description processor 10 according to a first embodiment of the present invention. A page description data acquisition unit 201 acquires first page description data from the RAM 103. A page description data interpretation unit 202 interprets the first page description data acquired by the page description data acquisition unit 201 for each rendering command. An affine transformation processing command extraction unit 205 extracts an affine transformation processing command contained in the rendering command divided by the page description data interpretation unit 202. An affine transformation calculation unit 206 subjects the affine transformation processing command acquired by the affine transformation processing command extraction unit 205 to calculation processing. A page description data replacement unit 203 replaces the rendering command acquired by the page description data interpretation unit 202 by another rendering command based on a calculation result obtained by the affine transformation calculation unit 206 to generate second page description data. A page description data output unit 204 stores the second page description data generated by the page description data replacement unit 203 in the RAM 103. Thus, the second page description data held in the RAM 103 is sent to an image forming apparatus such as a printer, and the image forming apparatus interprets the second page description data to form an image.

Figure 3:
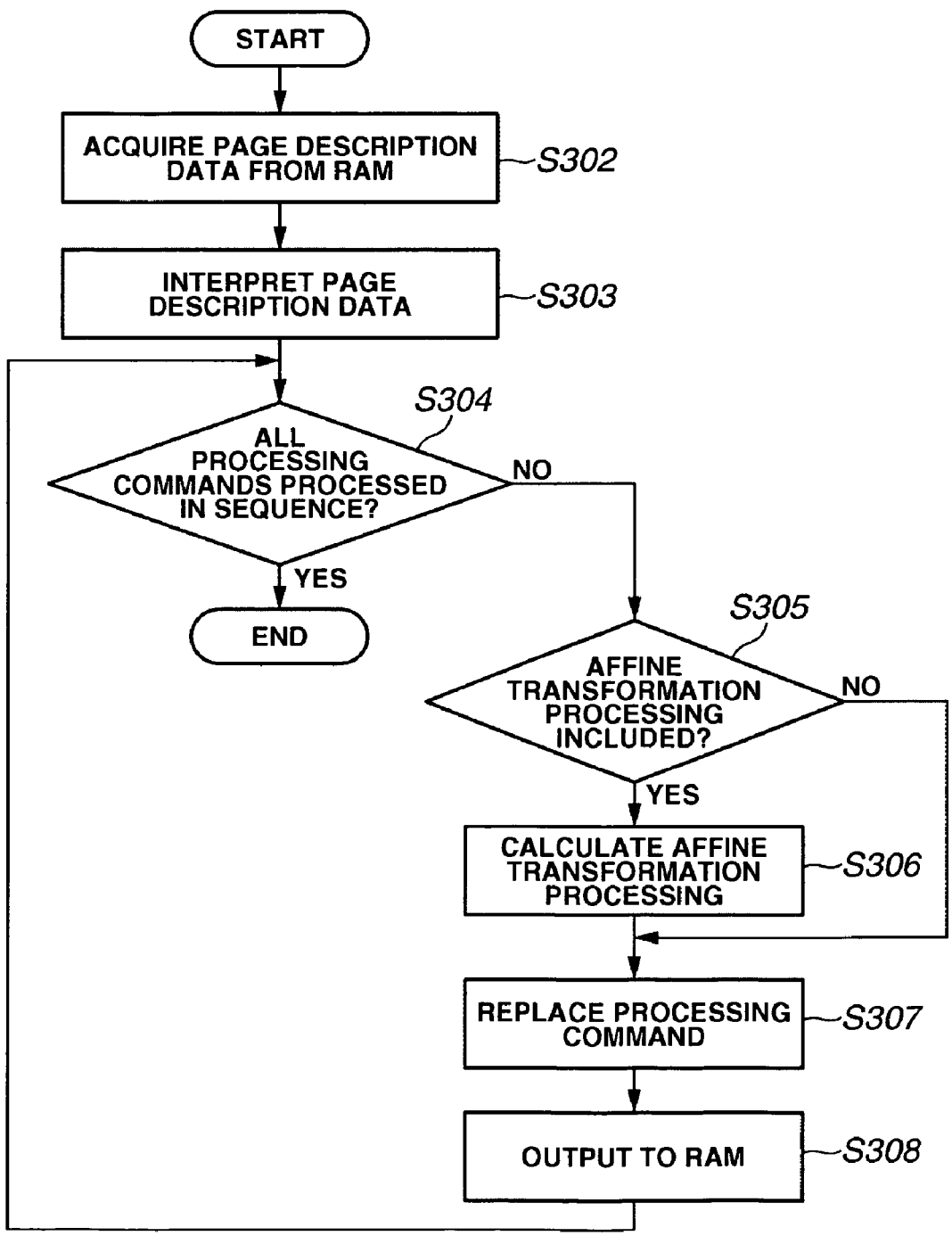
FIG. 3 is a flowchart showing an exemplary processing flow of the page description data processor according to the first embodiment of the present invention.

Referring to FIG. 3, an exemplary processing flow of the page description data processor 10 according to the first embodiment of the present invention will be described next. First page description data to be input is stored in a buffer area secured in the RAM 103. First, the page description data acquisition unit 201 acquires the first page description data from the buffer area of the RAM 103 (step S302). The page description data interpretation unit 202 interprets the acquired first page description data to break it down into rendering commands (step S303). Subsequently, the following processing is repeated for each rendering command (step S304).

First, it is determined whether the rendering command indicates affine transformation processing or processing including affine transformation processing (step S305). If conditions are satisfied, the affine transformation processing command extraction unit 205 extracts an affine transformation processing command, the affine transformation calculation unit 206 carries out affine transformation calculation, and a calculation result is stored in the RAM 103 (step S306). If the conditions are not satisfied, the processing of step S306 is not executed. Next, for a rendering command currently targeted to be processed, the page description data replacement unit 203 replaces the page description data based on the affine transformation calculation result stored in the RAM 103 (step S307). Further, the page description data output unit 204 stores a replacement result in the RAM 103 (step S308).

Next, the process of steps S304 to S308 will be described more in detail using, as an example, page description data shown in FIG. 4. The present invention does not specify any particular image description language. However, a case that uses SVG will be described herein. The page description data shown in FIG. 4 is broken down into rendering processing commands.

FIG. 5 is a schematic diagram showing the process of steps S304 to S308. A stack 530 is an area for storing the affine transformation calculation result, and its initial state is vacant. As the page description data processing processes processing commands in read sequence, a processing command 502 is read. A transform attribute indicates an affine transformation processing command, and an attribute value indicates an affine transformation operation. In this case, as translate (150 200) is an affine transformation operation, this is acquired to be transformed into an internal form 522. A transformation result is loaded on the stack 530. This result is a stack state 532. An affine transformation internal form of a top part of the stack 530 is denoted by 542. At this time, as the processing command 502 is not a graphic rendering processing command, page description data replacement processing or page description data output processing is not carried out (step 572).

Next, a processing command 503 is acquired to be similarly replaced by an affine transformation internal form 523. As the stack 530 is no longer vacant at this time, the affine transformation internal form 542 of the top part of the stack 530 and the affine transformation internal form 523 are multiplied together to be newly loaded as an affine transformation internal form 543 on the stack 530. Its result is a stack state 533. In this case, as the processing command 503 is not a graphic rendering processing command, page description data replacement processing or page description data output processing is not carried out (step 573).

A next processing command 504 is acquired. The processing command 504 contains an affine transformation processing command in a rectangle rendering command. First, the affine transformation processing command is extracted to be transformed into an affine transformation internal form 524, and a result of multiplying it by the affine transformation internal form 543 of the top part of the stack 530 is loaded as a new affine transformation internal form 544 on the stack 530. This result is a stack state 534 (step 574).

Next, the rectangle rendering command of the processing command 504 is interpreted. According to the processing command 504, a shape for a rectangle is designated. In the case of a rectangle, a shape is decided based on apex coordinates (x attribute and y attribute) of a left top, a width (width attribute), and a height (height attribute). Attribute values of x, y, width, and height are x, y, w, and h, an apex A is (x, y), an apex B is (x+w, y), an apex C is (x+w, y+h), and an apex D is (x, y+h). An area obtained by sequentially connecting apexes A-B-C-D-A by lines constitutes the shape. In an example shown in FIG. 4, A (−30, −20), B (30, −20), C (30, 20), and D (−30, −20) are set.

Next, an affine transformation internal form 544 is acquired as the affine transformation internal form of the top part of the stack 530 at this time, and a result of multiplying it by the apex A is stored as an apex A' in the RAM 103. For the apexes B to D, similarly, apexes B' to D' are stored in the RAM 103.

Subsequently, the processing command 504 is replaced by referring to coordinate values of the apexes A' to D'. Specifically, it is replaced by a path processing command. In SVG, the path processing command is described by a <path> element, and shape information is described by a d attribute. First, X and Y coordinates of the apex A' are transformed into a character string, separated by a comma (,), and a d attribute command 512 is generated after a character "M". X and Y coordinates of the apex B' are transformed into a character string, separated by a comma (,), and a d attribute command 513 is generated after a character "L". Similarly, X and Y coordinates of the apexes C' and D' are transformed into character strings, separated by commas (,), and d attribute commands 514 and 515 are generated after the character "L". Lastly, a d attribute command 516 only for a character "Z" is generated to interconnect start and end points of a graphic. The d attribute commands 512 to 516 are serialized to acquire a d attribute value 511 (step 575).

A processing command 510 acquired as a result is a replacement result of the processing command 504. In other words, it is a replacement result of contents described at 2nd to 7th lines in FIG. 4.

The rectangle rendering processing command by a <rect> element has been described. Similar processing can be carried out for another graphic rendering command or a rendering processing command such as a path (<path>) which is a rendering command capable of combining curves or lines. The graphic rendering commands include a circle (<circle>), an ellipse (<ellipse>), a polygon (<polygon>), a polyline (<polyline>), a line (<line>), and the like.

A case where such replacement processing is effective will be described. For example, in an environment where the image forming apparatus always receives page description data processed by the page description processor of the embodiment, a necessary graphic rendering processing command is a type of a path. A program in the image forming apparatus can be reduced in weight.

The method of replacing by the path rendering processing command which has removed all the affine transformation processing commands has been described. As another method, a method of removing multiple affine transformation commands, and replacing a rendering processing command by a processing command including 0 or 1 affine transformation processing command to output it without changing a graphic type of the rendering processing command will be described.

In FIG. 5, the same process is carried out in steps 572 to 574. Next, a rectangle rendering command of the processing command 504 is interpreted, and all groups of attribute names and attribute values except transform attributes are stored in the RAM 103. Then, the same graphic processing command as that of the processing command 504 is generated, and information of all attributes stored in the RAM 103 is set as its attributes. The affine transformation internal form 544 of the top part of the stack 530 stored in the stack 530 by the processing command 504 is acquired to be designated as an SVG transform attribute. Specifically, when an affine transformation internal form expressed by a matrix of 3×3 is expressed as shown in FIG. 6A, an expression of a character string shown in FIG. 6B becomes a transform attribute to be designated. Accordingly, in an example of the page description data shown in FIG. 4, a transform attribute value 591 is obtained. Subsequently, the transform attribute value 591 and the attribute information stored in the RAM 103 are combined to acquire a processing command 590 (step 576).

The processing command 590 as a result is a replacement result of the processing command 504. In other words, it is a replacement result of contents described at 2nd to 7th lines in FIG. 4.

The replacement processing is effective when the image forming apparatus processes a specific graph at a high speed. For example, it is known that when image formation of a general ellipse is fast, a graph of an ellipse or circle affine transformation processing result always becomes a general ellipse. In this case, it is advised to leave information that an input rendering processing command is a rendering command of a circle or an ellipse, rather than performing path replacement, because it contributes more to achievement of a high speed of rendering processing in the image forming apparatus.

Second Exemplary Embodiment

Next, page description data processing according to a second exemplary embodiment of the present invention, specifically, layout processing, will be described with reference to the accompanying drawings.

Figure 7:
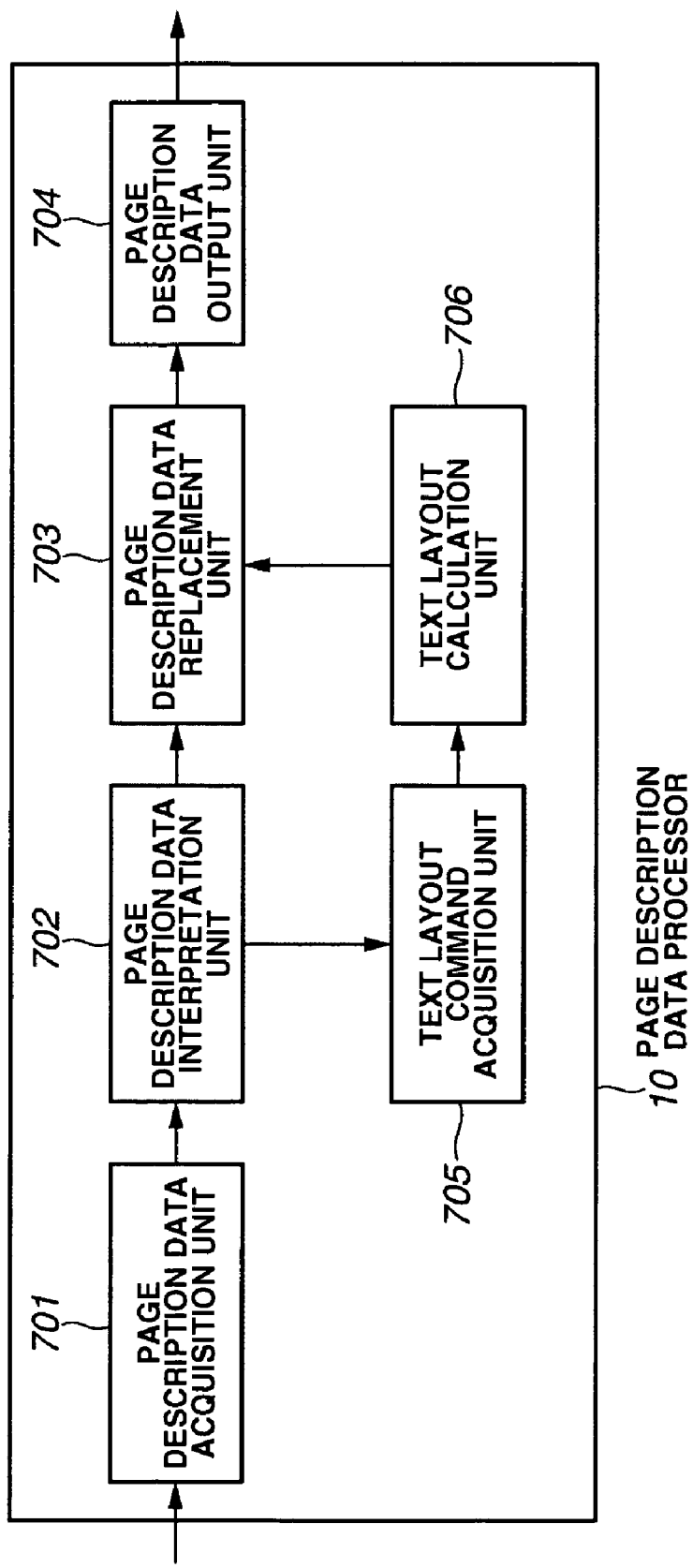
FIG. 7 is a block diagram showing an exemplary configuration of a page description data processor according to a second embodiment of the present invention.

FIG. 7 is a block diagram showing an exemplary configuration of a page description data processor according to the second embodiment of the present invention. A page description data acquisition unit 701 acquires first page description data. A page description data interpretation unit 702 interprets the first page description data acquired by the page description data acquisition unit 701 for each rendering command. A text layout processing command acquisition unit 705 acquires a text layout command contained in the text rendering command divided by the page description data interpretation unit 702. A text layout calculation unit 706 subjects the text layout command acquired by the text layout command acquisition unit 705 to calculation processing. A page description data replacement unit 703 replaces the text rendering command acquired by the page description data interpretation unit 702 by another text rendering command based on a text layout calculation result obtained by the text layout calculation unit 706 to generate second page description data. A page description data output unit 704 stores the second page description data generated by the page description data replacement unit 703 in a RAM 103.

Figure 8:
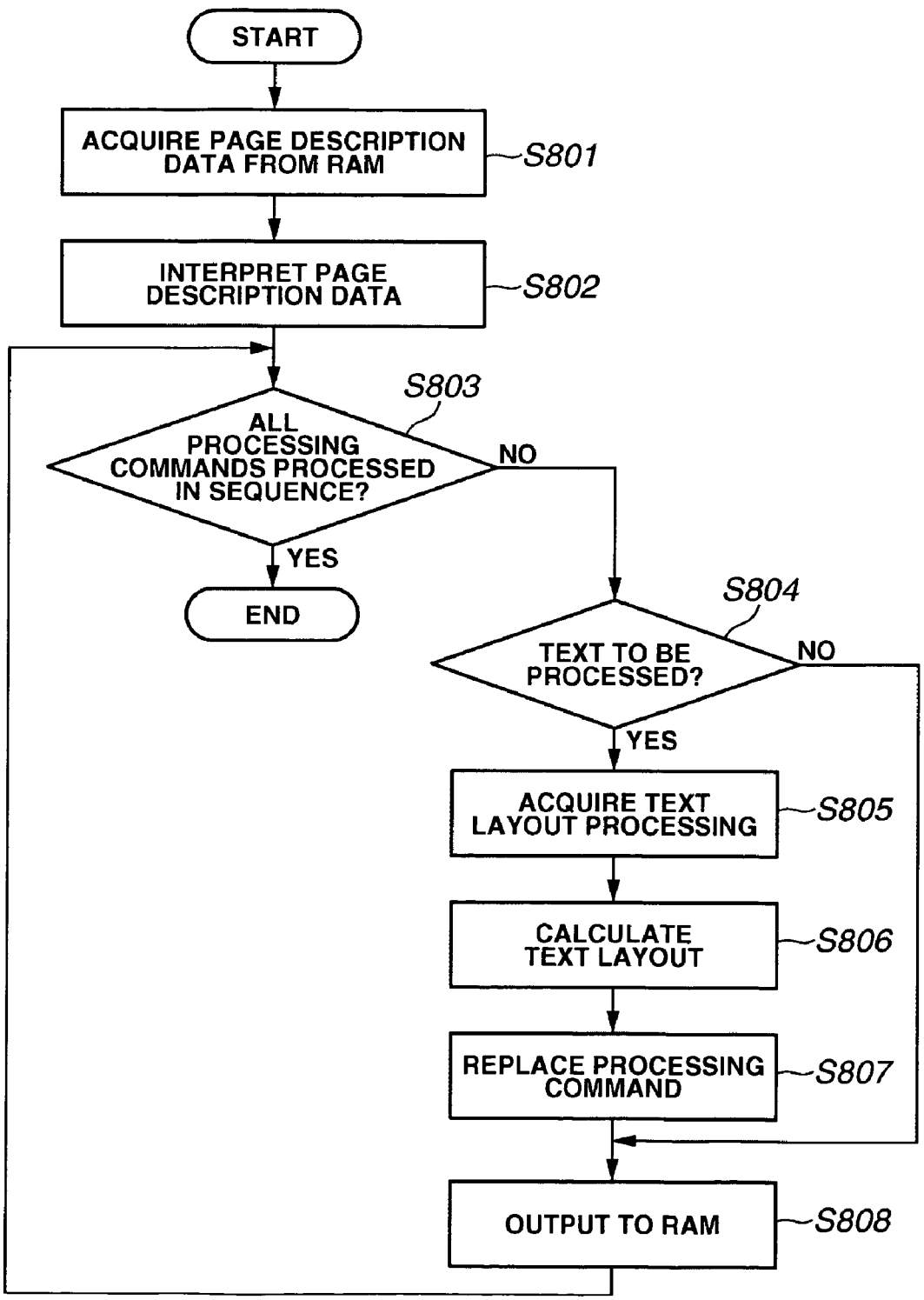
FIG. 8 is a flowchart showing an exemplary processing flow of the page description data processor according to the second embodiment of the present invention.

Referring to FIG. 8, an exemplary processing flow of the page description data processor 10 according to the second embodiment of the present invention will be described next. Page description data to be input is stored in a buffer area secured in the RAM 103. First, the page description data acquisition unit 701 acquires the page description data from the buffer area of the RAM 103 (step S801). The page description data interpretation unit 702 interprets the acquired page description data to break it down into processing commands (step S802). Subsequently, the following processing is carried out for the divided processing commands in read sequence (step S803).

First, it is determined whether the processing command is a text rendering processing command (step S804). If the processing command is not a text rendering processing command, it is directly output to the RAM 103 from the page description data output unit 704 (step S808) without being subjected to replacement processing at the page description data replacement unit 703.

If the processing command is determined to be a text rendering processing command in step S804, a layout processing command contained in the text rendering processing command is extracted (step S805). The layout processing command may not be clearly indicated, in the text rendering processing command. In many cases, however, there is an implicit rule, e.g., when a character string is rendered, it is laid out immediately after a last character is rendered. It is presumed here that the processing includes such an implicit layout rule. Next, layout calculation is carried out for each character to be rendered with the text rendering processing command (step S806). Subsequently, the processing command is replaced by another processing command based on the layout calculation result (step S807), and the replaced processing command is output from the page description data output unit 703 to the RAM 103 (step S808).

The process of steps S803 to S808 will be described more in detail using, as an example, page description data shown in FIG. 9. The present invention does not specify any particular page description language. However, a case that uses SVG will be described herein.

The page description data shown in FIG. 9 is a text rendering processing command at 2nd to 4th lines, which has contents of an instruction to render a character string of "ABCD" with the position of X and Y coordinates 10 and 100 set as a starting point. The dx attribute of the <text> element designates the amount of shifting a character in the X axis direction. Normally, the character string of "ABCD" is rendered in a closely-spaced state. However, a space can be generated between characters by designating the dx attribute. In this example, a space of 10 pixels is instructed to be generated between characters.

Figure 10:
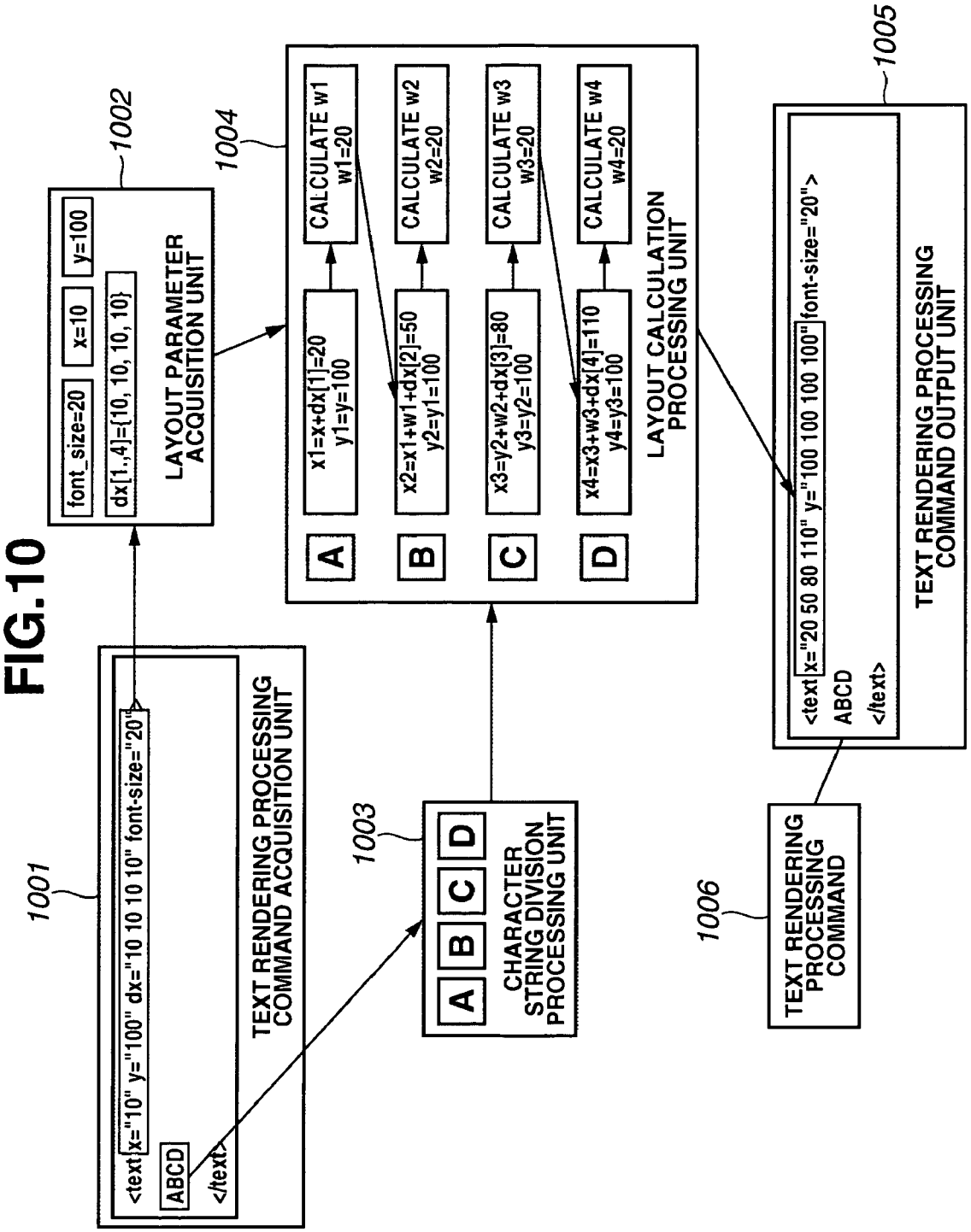
FIG. 10 is a schematic diagram showing exemplary page description data replacement processing in the page description data processor according to the second embodiment of the present invention.
Figures 11A, 11B:
FIGS. 11A and 11B are diagrams showing an example of page description data for executing a graphic rendering processing command which accompanies multiple affine transformation processing, and its rendering result.

FIG. 10 is a schematic diagram showing an exemplary processing flow. As the page description data shown in FIG. 9 is determined to be a text rendering processing command, the processing command is input to a text rendering processing command acquisition unit 1001. First, a layout parameter acquisition unit 1002 acquires attribute values of the x attribute, the y attribute, the dx attribute, and the font-size attribute, which are layout processing commands of the <text> element, transforms them into numerical values, and stores the numerical values in the RAM 103. Then, a character string division processing unit 1003 divides the character string "ABCD" to be rendered into separate characters "A", "B", "C", and "D".

Next, a layout calculation processing unit 1004 calculates a layout position of each character. First, coordinates (x1, y1) of the layout position of "A" are obtained. As "A" is a head of the character string, coordinates where a shifting amount dx[1] by the dx attribute is added to a starting point (x, y) of the character string in the layout parameter are coordinates to be obtained. In an example shown in FIG. 9, coordinates to be obtained are (20, 100) because x=10, y=100, and dx=10. Further, a width equivalent to one character of "A" is calculated. A character width may vary from one font type to another, and from one character to another. In this case, a description will be made by presuming a font where a fixed pitch font (font defined so that all characters are set equal in width) is used, and a font width is "20" when "20" is designated as a font size. A width w1 of a font obtained here is equal to 20 pixels.

Subsequently, coordinates (x2, y2) of the layout position of "B" are obtained. "B" is designated to be shifted from a position of rendering a last character in the X axis direction by +10 pitches by the dx attribute. Accordingly, the coordinates (x2, y2) of the layout position of "B" can be obtained by adding, to the layout position (x1, y1) of "A", a width w1 equivalent to one character of "A" and a shifting amount dx[2] by the dx attribute, which are thus (50, 100). Also, similar processing is carried out for "C" and "D" to obtain respective layout position coordinates C (x3, y3)=(80, 100), and D (x4, y4)=(110, 100).

Next, the text rendering processing command is replaced based on a calculation result by the layout calculation processing unit 1004. As the position calculation has been completed for "A", "B", "C", and "D" at the layout calculation processing unit 1004, these pieces of coordinate information are designated as the x attribute and the y attribute of the <text> element. By describing the x and y attributes to be x="x1, x2, x3, x4" and y="y1, y2, y3, y4", a layout of the character string to be rendered can be designated. When the page description data shown as an example in FIG. 9 is input, the text rendering processing command subjected to replacement processing is described as a text rendering processing command 1006 shown in FIG. 10, and the text rendering processing command 1006 is output to the RAM 103 by a text rendering processing command output unit 1005.

Through the above processing, without executing calculation processing regarding a text layout at the rendering processor, rendering can be carried out only by referring to the simply designated x and y attribute values, and a high speed of processing of the rendering processor can be achieved.

The processing example of laying out a character string by enlarging the pitch between characters has been described. Even in other cases where a character string is arranged on a curve (FIG. 15B), or arranged by relative head, center, and tail alignments for the designated point (FIG. 12B), layout calculation and replacement can be carried out by the above-described method. In addition, in the case of rotating a character, such rotation processing can be performed by using the rotate attribute of the <text> element in SVG.

Other Exemplary Embodiments

The present invention can be achieved by supplying a recording medium having program code of software recorded therein to realize the functions of the above-described embodiments to a system or an apparatus, and causing a computer (a CPU or an MPU) of the system or the apparatus to read and execute the program code stored in the recording medium. In this case, the program code read from the recording medium realizes the functions of the embodiments, and the recording medium storing the program code constitutes the present invention.

The recording medium for supplying the program code includes, for example, a flexible disk, a hard disk, an optical disk, a magneto-optical disk, a CD-ROM, a CD-R, a magnetic tape, a nonvolatile memory card, a ROM, a DVD, and the like.

By executing the program code read by the computer, the functions of the embodiments are realized as described above. The invention includes a case where an operating system (OS) or the like running on the computer executes a part or all of actual processing based on instructions of the program code, and the functions of the embodiments are realized through the processing.

The present invention includes a case where the program code read from the recording medium is written in a memory disposed in a function expansion board inserted into the computer or a function expansion unit connected to the computer, then a CPU or the like disposed in the function expansion board or the function expansion unit executes a part or all of actual processing based on the instructions of the program code, and the functions of the embodiments are realized through the processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-163964 filed Jun. 3, 2005, which is hereby incorporated by reference herein in its entirety.

What is claimed is:

1. An image description data processing method for execution in an apparatus including a holding unit, the method comprising:

acquiring first image description data from the holding unit, the first image description data being described in an image description language and comprising (a) a graphic rendering command defining a shape and (b) a plurality of first processing commands, each of the first processing commands having an affine transformation;

extracting the graphic rendering command and the plurality of first processing commands from the acquired first image description data;

generating second image description data described in the image description language, the second image description data being based on (1) the extracted graphic rendering command and (2) a second processing command derived by sequentially multiplying by each other the affine transformations of the plurality of extracted first processing commands, wherein the second image description data includes a path element and excludes affine transformations; and sending the generated second image description data to an image forming apparatus which interprets the generated second image description data to form an image.

2. The image description data processing method according to claim 1, further comprising forming an image rendered based on the second image description data.

3. The image description data processing method according to claim 1, wherein the graphic rendering command describes a command of rendering at least one of a rectangle, an ellipse, a circle, an elliptic arc, a circular arc, a line, a polygon, a polyline, a curve, a text, or a combination thereof.

4. The image description data processing method according to claim 1, further comprising:

storing the acquired first image description data; and replacing the stored first image description data with the generated second image description data.

5. The image description data processing method according to claim 1, wherein the graphic rendering command defines the shape formed by a width attribute, a height attribute and a vertex coordinate.

6. The image description data processing method according to claim 1, wherein the second image description data comprises (1) four vertex values of a rectangular shape converted from the extracted graphic rendering command and (2) the second processing command derived by multiplying the affine transformations of the plurality of extracted first processing commands in sequence.

7. An apparatus for processing image description data, comprising:

a memory unit configured to hold the image description data an acquisition unit configured to acquire first image description data from a memory unit, the first image description data being described in an image description language and comprising (a) a graphic rendering command defining a shape and (b) a plurality of first processing commands, each of the first processing commands having an affine transformation;

an extraction unit configured to extract the graphic rendering command and the plurality of first processing commands from the first image description data;

a generating unit configured to generate second image description data described in the image description language, the second description data being based on (1) the extracted graphic rendering command and (2) a second processing command derived by sequentially multiplying by each other the affine transformations of the plurality of extracted first processing commands, wherein the second image description data includes a path element and excludes affine transformations; and a sending unit configured to send the generated second image description data to an image forming apparatus which interprets the generated second image description data to form an image.

8. A non-transitory computer-readable storage medium storing thereon a computer-executable program for causing an apparatus to:

acquire first image description data from a holding unit, the first image description data being described in an image description language and comprising (a) a graphic rendering command defining a shape and (b) a plurality of first processing commands, each of the first processing commands having an affine transformation;

extract the graphic rendering command and the plurality of first processing commands from the first image description data;

generate second image description data described in the image description language, the second image description data being based on (1) the extracted graphic rendering command and (2) a second processing command derived by sequentially multiplying by each other the affine transformations of the plurality of extracted first processing commands, wherein the second image description data includes a path element and excludes affine transformations; and send the generated second image description data to an image forming apparatus which interprets the generated second image description data to form an image.

* * * * *